E. E. NOLAN & W. H. PIERCE.
MACHINE FOR CUTTING UP ICE.
APPLICATION FILED JUNE 28, 1909.
1,024,594.
Patented Apr. 30, 1912.
2 SHEETS—SHEET 2.
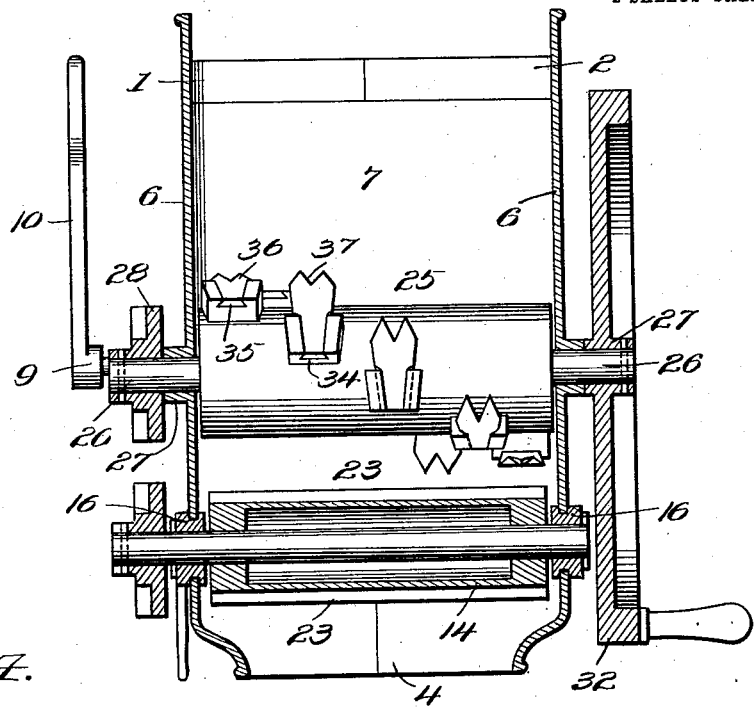
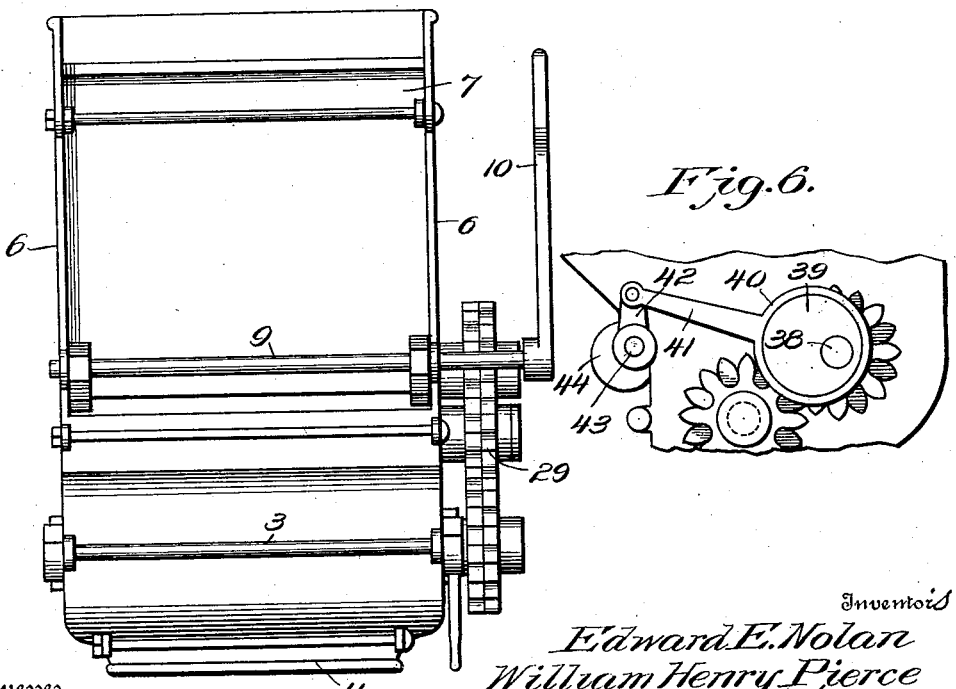
Witnesses
Edwin F. McKee
James A. Loehl
Inventors
Edward E. Nolan
William Henry Pierce
By Victor J. Evans
Attorney
COLUMBIA PLANOGRAPH CO., WASHINGTON, D. C.

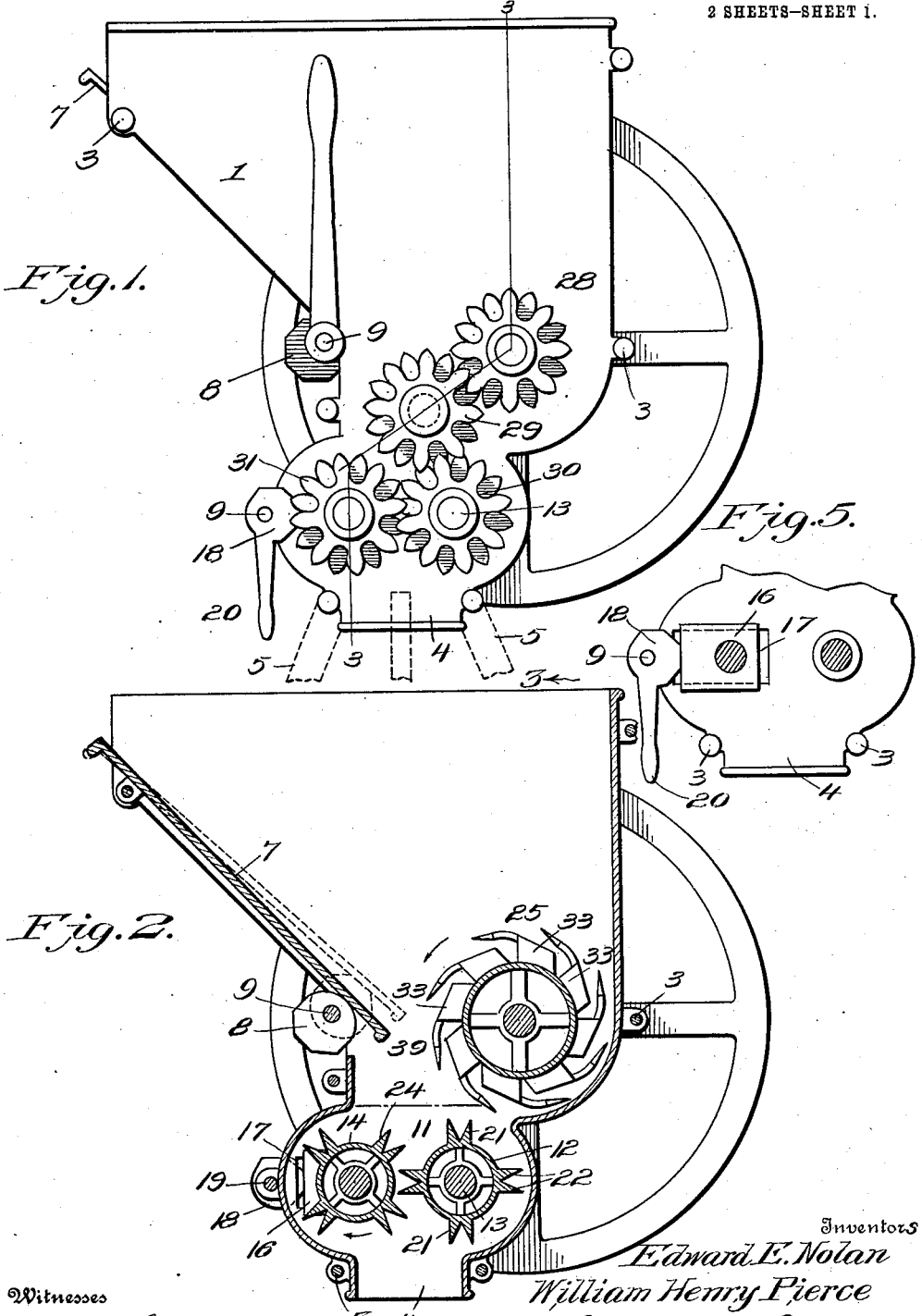

UNITED STATES PATENT OFFICE.

EDWARD E. NOLAN AND WILLIAM H. PIERCE, OF CHICAGO, ILLINOIS, ASSIGNORS TO GEORGE S. BLAKESLEE, OF CHICAGO, ILLINOIS.

MACHINE FOR CUTTING UP ICE.

1,024,594.　　　　　Specification of Letters Patent.　　Patented Apr. 30, 1912.

Application filed June 28, 1909. Serial No. 504,804.

*To all whom it may concern:*

Be it known that we, EDWARD E. NOLAN and WILLIAM H. PIERCE, citizens of the United States, residing at Chicago, in the county of Cook and State of Illinois, have invented certain new and useful Improvements in Machines for Cutting Up Ice, of which the following is a specification, reference being had to the accompanying drawings.

Our invention relates to machines for cutting up masses of ice into small pieces for the various uses for which broken or chopped ice is commonly employed, and it has for its object to provide a new and improved machine by which comparatively large blocks or chunks of ice may be easily and quickly comminuted without, however, pulverizing the ice so as to make what is commonly termed "snow ice," which is usually to a great extent waste.

We accomplish this object as illustrated in the drawings and as hereinafter described.

What we regard as new is set forth in the claims.

In the accompanying drawings,—Figure 1 is a side elevation of a machine embodying our improvements; Fig. 2 is a longitudinal vertical section through the same; Fig. 3 is a vertical cross-section on line 3—3 of Fig. 1; Fig. 4 is an end elevation; Fig. 5 is a detail, showing the mechanism for adjusting one of the cutting rollers; and Fig. 6 is a detail, showing a modified arrangement of the mechanism for rocking the feed-table of the hopper.

Our improved machine comprises, generally speaking, a hopper in which the ice to be cut up is placed and by which it is fed to a rotary cutter placed at one side of the throat of the hopper. At the side of the hopper opposite the rotary cutter is an inclined feed plate or table which directs the ice toward the cutter and which is provided with a series of teeth spirally disposed upon its outer surface so that as the cutter rotates the ice block is chopped or cut up into smaller pieces. Below the throat of the hopper and receiving the chunks of ice cut from the larger mass in the hopper by the rotary cutter above mentioned are a pair of coöperating cutters, each provided with a series of longitudinally-extending blades preferably arranged in pairs and at different points around the surfaces of the lower cutters which are in general cylindrical in form. The lower cutters are so arranged relatively to each other that their blades alternately come into operation as the cutters rotate in opposite directions,—the lower cutters in a sense intermeshing. These lower cutters serve to further cut up the chunks of ice cut from the original mass in the hopper and deliver the ice in a finely cut up condition and without the formation of snow ice.

Referring now to the drawings for a more particular description of the embodiment of our invention therein shown,— 1—2 indicate the sides of the hopper, which are connected by connecting-bolts 3, or other suitable retaining devices.

4 indicates a discharge opening or spout at the lower end of the hopper, and 5 indicates supporting legs suitably arranged to support the machine.

7 indicates an inclined feed table or plate, which is provided at one side of the hopper between the walls 1—2, being pivoted at or near its upper end preferably upon one of the cross-bolts 3, as best shown in Fig. 2. The lower free end of the feed-table 7 rests upon an eccentric block or cam 8 which is mounted upon a shaft 9 which extends transversely of the machine and is provided at one end with a hand-lever 10 by which the eccentric 8 may be rotated. Obviously, by rotating said eccentric the lower end of the feed-table 7 may be adjusted so as to cause it to project to a greater or less extent into the hopper and consequently vary the operative area of the throat of the hopper.

25 indicates a rotary cutter, which is in the form of a cylinder extending transversely of the lower portion of the hopper, as best shown in Fig. 2. Said cutter is mounted opposite the lower end of the feed-table 7 and is adjacent to the opposite end wall of the hopper, forming the throat through which the chopped up ice passes down and out of the hopper. The cutter 25 is provided with trunnions 26 at its opposite ends, which are suitably journaled in bearings 27 provided in the sides of the machine, one of said bearings carrying a crank-wheel 32 for rotating the cutter. The opposite trunnion is provided with a pinion 28 for communicating power to other parts of the machine, as will be hereinafter described. The cutter 25 is provided on its periphery with a series of lugs 33 spirally arranged, as best shown in Fig. 3, and each of said lugs has formed therein a dove-tailed recess 34 which receives the correspondingly-shaped shank 35 of a pick or cutting device 36. As shown in Fig. 2, the grooves 34 are somewhat angularly disposed in order to hold the picks at the desired angle. Preferably the inner surfaces of the shanks 35 are beveled, and the operating faces of the several picks are pronged, as shown at 37 in Fig. 3. The arrangement is such that when the cutter 25 is rotated toward a block of ice resting upon the feed-table 7, as indicated by the arrow in Fig. 2, it will operate to chip or cut off the lower portion of the mass, which will fall down through the throat 39 of the hopper.

12—14 indicate a pair of parallel cutting cylinders, which are mounted in the lower portion of the machine, extending transversely thereof in such position that their inner margins underlie the throat 39 of the hopper. Said cylinders are mounted, respectively, upon shafts 13—15, the ends of which are fitted in suitable bearings in the sides of the machine, as best shown in Fig. 3. At the left-hand ends of the shafts 13—15, as shown in Fig. 3, they carry pinions 30—31 which intermesh with each other,—the pinion 30 being connected by an idler 29 with the pinion 28. By this construction the cylinders 12—14 are caused to rotate in opposite directions and rotate in unison with the cutter 25. The direction of rotation of the cylinders 12—14 is shown by the arrow in Fig. 2.

21 indicates pairs of blades, which extend longitudinally of and project from the surface of the cylinder 12, as best shown in Fig. 2. Preferably four of such pairs of blades are provided on the cylinder 12, and a corresponding number of similar blades are provided on the cylinder 14, the latter blades being indicated by 24. In cross-section said blades have a spur-like appearance, but they extend longitudinally from one end of each of the cylinders to the other, as shown at 23 in Fig. 3. The two cylinders 12 and 14 are so adjusted relatively to each other that the several pairs of blades of one cylinder alternate with those of the other as the cylinders rotate. This is best shown in Fig. 2. The result is that the several pairs of blades act alternately upon the chunks of ice falling through the throat 39 and cut up such chunks into smaller pieces, which are discharged through the outlet 4.

In order to regulate the size of the pieces of ice delivered from the machine, the shaft 15 of the cylinder 14 is mounted in adjustable boxes 16, which are adapted to slide longitudinally of the machine, as best shown in Figs. 3 and 5, and a lever 20 having a cam 18 is provided for adjusting such boxes, the cam bearing against one end of one of the boxes, as shown in Fig. 5. By moving the cylinder 14 closer to the cylinder 12 it will be obvious that the ice will be cut up into a finer condition, whereas by moving said cylinder away from the cylinder 12 the ice will be delivered in larger pieces.

In operating the machine the ice to be cut up is placed in the hopper and slides down the inclined feed-table 7 into engagement with the picks of the cutter 25. By rotating the cutter in the direction indicated by the arrow in Fig. 2 the picks will operate to cut away the ice, the pieces falling through the throat 39 between the cylinders 12—14 where they are further cut up by the blades carried by said cylinders. By providing the cylinders 12—14 with continuous blades instead of picks or teeth the proper cutting up of all the ice delivered from the hopper is assured, as no pieces of ice can fall through the machine without being operated upon by the lower cutters. Furthermore, the operation is rather one of cutting than of planing or chiseling the ice, so that there is practically no snow ice formed, but the ice is delivered in pieces of large or small size, as desired.

We do not desire to limit ourselves to the provision of manually-operated means for driving the machine, as it is obvious that the crank-wheel 32 can be connected in any suitable manner to a motor.

In the modified form of our invention shown in Fig. 6 the shaft or trunnion 38' of the cylinder 25 has secured thereto an eccentric 39' with which is engaged a strap 40. The strap 40 carries an arm 41 which is pivotally connected to the crank-arm 42 of the eccentric shaft 43. The eccentrics 44 upon said shaft are adapted for engagement with the feed-table or plate 7 hereinbefore described. This form of our invention is particularly desirable when a motor is operatively connected for furnishing the desired driving power. It will be seen that in such instance the eccentrics 44 will be operated to change the angular position of the said feed-table or apron. The driving gears which operatively engage each other to revolve the cutting and crushing cylinders are each formed with a plurality of series of peripheral teeth, as clearly shown in Fig. 1 of the drawings. The teeth are somewhat elongated and are of such construction that the cylinder 14 can be adjusted with respect to the cylinder 12 so that the teeth of said gears will not become casually disengaged from each other, as will be appreciated.

That which we claim as our invention, and desire to secure by Letters Patent, is—

1. A machine for cutting up ice, comprising a hopper, a rotary cutter therein having a plurality of cutting devices disposed at intervals longitudinally thereof, and a pair of coacting rotary cutters arranged to receive material from the hopper, the latter cutters having blades extending longitudinally thereof.

2. A machine for cutting up ice, comprising a hopper, a rotary cutter therein having a plurality of cutting devices disposed at intervals longitudinally thereof, and a pair of coacting rotary cutters arranged to receive material from the hopper, the latter cutters having blades extending longitudinally thereof and arranged in pairs.

In testimony whereof we affix our signatures in presence of two witnesses.

EDWARD E. NOLAN.
WILLIAM H. PIERCE.

Witnesses:
WILLIE KING,
ROYAL LOVEDAY.

Copies of this patent may be obtained for five cents each, by addressing the "Commissioner of Patents, Washington, D. C."